US007455590B2

(12) United States Patent
Hansen et al.

(10) Patent No.: US 7,455,590 B2
(45) Date of Patent: Nov. 25, 2008

(54) SENDING MESSAGES IN RESPONSE TO EVENTS OCCURRING ON A GAMING SERVICE

(75) Inventors: Peter Hansen, Bellevue, WA (US); Noah R. Heller, Kirkland, WA (US); Mark D. VanAntwerp, Redmond, WA (US); Boyd C. Multerer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 10/434,611

(22) Filed: May 9, 2003

(65) Prior Publication Data

US 2004/0224769 A1 Nov. 11, 2004

(51) Int. Cl.

| | |
|---|---|
| ***A63F 9/24*** | (2006.01) |
| ***A63F 13/00*** | (2006.01) |
| ***G06F 15/16*** | (2006.01) |
| ***G06F 15/177*** | (2006.01) |

(52) U.S. Cl. ............................ 463/40; 463/42; 463/43; 463/39; 709/206; 709/207; 709/217; 709/227

(58) Field of Classification Search ............. 463/39–43; 709/206–207, 217–227

See application file for complete search history.

(56) References Cited

U.S. PATENT DOCUMENTS

| | | | | |
|---|---|---|---|---|
| 5,797,795 | A * | 8/1998 | Takemoto et al. | 463/42 |
| 5,999,808 | A * | 12/1999 | LaDue | 455/412.2 |
| 6,018,766 | A * | 1/2000 | Samuel et al. | 709/218 |
| 6,830,515 | B2 * | 12/2004 | Rowe | 463/42 |
| 2002/0049074 | A1 * | 4/2002 | Eisinger et al. | 455/552 |
| 2002/0055385 | A1 * | 5/2002 | Otsu | 463/42 |
| 2002/0065890 | A1 * | 5/2002 | Barron | 709/206 |
| 2002/0116615 | A1 | 8/2002 | Nguyen et al. | 713/168 |
| 2002/0142842 | A1 | 10/2002 | Easley et al. | 463/42 |
| 2002/0165024 | A1 * | 11/2002 | Puskala | 463/40 |
| 2003/0008713 | A1 * | 1/2003 | Ushiro et al. | 463/42 |
| 2003/0027639 | A1 * | 2/2003 | Peterson et al. | 463/42 |
| 2003/0134678 | A1 * | 7/2003 | Tanaka | 463/42 |
| 2003/0228907 | A1 * | 12/2003 | Gatto et al. | 463/42 |
| 2005/0090313 | A1 * | 4/2005 | Rowe | 463/42 |

FOREIGN PATENT DOCUMENTS

| | | |
|---|---|---|
| EP | 1475756 A2 | 4/2004 |
| GB | 2320595 | 6/1998 |
| JP | 2002058879 | 2/2002 |
| JP | 2002073459 | 3/2002 |
| JP | 2003210851 | 7/2003 |
| RU | 2181066 | 4/2002 |

* cited by examiner

*Primary Examiner*—Robert E Pezzuto
*Assistant Examiner*—Sunit Pandya
(74) *Attorney, Agent, or Firm*—Lee & Hayes, PLLC

(57) ABSTRACT

Alerts are transmitted to subscribers to an alerts service in response to events that occur within a gaming environment. Communication within the gaming environment is limited to specific game consoles and the gaming service. A subscriber to the alert notification service can be alerted when a friend joins the gaming service to play a game, or can select other events for which an alert is requested to be sent to the subscriber. In response to any predetermined event occurring within the gaming environment, an alerts service provides an alert or message that is transmitted through a secure firewall and outside the gaming environment. The alert message can be in the form of a pop-up that appears on a user's instant messaging service, or an email, or a message that is transmitted through a mobile communication service to a cell phone or other portable communication device.

28 Claims, 7 Drawing Sheets

DEVICES OPERATING OUTSIDE GAMING ENVIRONMENT

SENDING MESSAGES IN RESPONSE TO EVENTS OCCURRING ON A GAMING SERVICE

FIELD OF THE INVENTION

This invention generally relates to a method and system for automatically transmitting a message in response to an event occurring within a secure and limited access gaming environment, and more specifically, relates to transmitting an alert or message over a network using one or more different formats, in response to an event that has occurred within the gaming environment, so that the alert or message is received by an intended recipient who is not currently connected in direct communication with the gaming environment.

BACKGROUND OF THE INVENTION

The popularity of multiplayer online games on the Internet has exploded in recent years. Unlike conventional single player electronic games, multiplayer online games enable a player to participate in games with other players, either as an individual or as a team member. The multiplayer aspect of these games adds to the players' gaming experience by offering new gaming considerations, including strategy, teamwork, and rivalries.

In order to enable playing of a multiplayer online game, host services must be provided by either an individual or a third-party host. Host services are typically executed on a host computer or server that determines who the game participants are, and whether new players may be added to each game session.

Examples of multiplayer online games that are hosted by third-party providers can be found at many gaming web sites, including Microsoft Corporation's Internet Game Zone, which provides a myriad of single player and multiplayer online games that are played by over a half-million users daily. In order to play most of the games on such a gaming site, it is necessary for users to download (or separately procure) a copy of the game the user wishes to play. Some of these games may typically be downloaded for free, while others must be purchased, either online, or at a retail outlet. In addition, many gaming sites offer "premium" games that can only be accessed if the user has paid a membership fee to play the games, or has agreed to pay a usage fee (e.g., an hourly, daily, or monthly fee).

In contrast to Internet gaming web sites that are broadly accessible over the Internet using a conventional browser, a more secure and limited access gaming environment is provided by a gaming service such as Microsoft Corporation's XBOX LIVE™, which is dedicated specifically to enabling players to connect in communication with other XBOX™ game consoles over a broadband Internet connection, so that users of the XBOX game console can participate in multiplayer game within the XBOX gaming environment. Only those who have paid an annual fee and have registered their game console with the XBOX LIVE gaming service when signing up for the online gaming service are able to participate in such games. Although the connection between the participants' XBOX game consoles and the gaming service is over the Internet, this communication uses virtual private network (VPN) tunnels to ensure security and employs the user datagram protocol (UDP) instead of the more common transmission control protocol/internet protocol (TCP/IP) for the communication of data packets.

In order to facilitate online game playing, it is necessary to enable players to join games already in progress, or enable players to initiate a new game in a manner that allows other players to join in. Oftentimes, players prefer to play games against (or with) players they already know. In general, many of the third-party gaming sites provide host services that make it relatively easy to join games, schedule future games, establish teams, etc. However, there is presently no way to easily initiate game play between players for games that are hosted by individual players.

In order to host a game, the host needs to be able to identify and communicate with all of the game participants. A common scheme for performing this task involves the use of Internet Protocol (IP) addressing. In order to communicate over a communications network, such as the Internet, each device (e.g., a player's computer) connected to the network must be assigned to a unique network address. Under the Internet's present TCP/IP scheme (which is also used on other types of networks), each device connected to the Internet is identified by a 32-bit IP address comprising four 8-bit segments separated by dots, e.g., 207.21.32.212. Each IP address comprises a unique network ID, and a unique host ID, the latter of which identifies a workstation, server, router, or other TCP/IP device on the network. Accordingly, each of the individual computers used by the game players is assigned to its own IP address. As a result, a game host can enable new players to join a game by telling the other players the IP address of the host's machine.

The problem of inviting friends to join a game has been even greater in a dedicated, secure gaming environment such as XBOX LIVE™, where access to the gaming environment is only permitted through a specific gaming console. A player who wants to invite friends to join in playing a multiplayer game in the XBOX LIVE gaming environment has not been able to directly communicate over the Internet from within the gaming environment with friends who are not also thus connected, since the dedicated XBOX™ game consoles have only been able to directly communicate with the gaming service and with other players who are connected to the gaming environment. There is no provision from within the gaming environment for a user of an XBOX™ console to directly connect over the Internet to any other entity who is outside the gaming environment. Currently, participants who are coupled with the XBOX LIVE™ gaming service can request friends who are also connected to the gaming service to join in playing a multiplayer game, but the process does not permit friends who are not connected to the gaming service to receive any notification of an invitation to join in a game.

In addition to receiving a notification that a friend has issued an invitation to join in playing a game on a gaming service, a user of the gaming service might simply want to be alerted when a friend has connected to the gaming service. Other events occurring in the gaming service might also be of interest to a person who has subscribed to the gaming service. For example, the person might want to be advised when changes have been made to a game, such as issuance of a new version, or when new levels or new functionality has been provided. Billing information may also be of interest to a subscriber to the gaming service. To provide maximum benefit, any alert or message notifying a subscriber to the gaming service that any of these events has occurred within the gaming service must be transmitted outside the gaming environment so that it can be received by the person when not connected within the gaming environment. The person may want to be notified by an email message or by a message that is received on a mobile communication device, such as a cell phone. Provision of an alerts system that can respond to events occurring within the relatively limited access gaming environment by transmitting messages outside the secure gaming environment in various formats can provide a valuable information resource to those who want to be apprised of such events as quickly as possible.

SUMMARY OF THE INVENTION

There are clearly advantages in responding to events within a secure gaming environment by initiating alerts or messages that are sent to others who are not currently connected to the gaming environment. However, as noted above, the gaming environment strictly controls access and is designed to enable communication with those who are not connected through a specific game console. Players participating within the gaming environment communicate through a secure gateway that limits access to the gaming environment. This secure gateway is inaccessible by a person communicating over the network, outside of the gaming environment. The present invention addresses this problem by creating a link between the gaming environment and an alerts service that has general access to the Internet.

This method is specifically directed to responding to a predefined event within a gaming environment by automatically transmitting a message to a person who is outside the gaming environment. The method provides for detecting that the predefined event has occurred within the gaming environment, and in response, transmitting an alert or message to the person over a network. This alert or message is then accessible by the person outside the gaming environment and provides information related to the predefined event.

An indicia of the information to be provided in the alert or message is supplied to a messaging service that is outside the gaming environment. The messaging service then transmits the message with the information to the person over the network.

The message can be transmitted in one or more different formats, including as an email that is sent to the person over the network, as a message that is sent over the network to a communication system that retransmits the message to a portable communication device of the person, or as a toast notification that is transmitted over the network and displayed to the person as a pop-up. (The term "toast" is applied to the pop-up alert that is displayed, because it is reminiscent of a piece of toast popping up from a toaster.)

The predefined event can occur, for example, when a specific player accesses the gaming environment. Information identifying the player is then transmitted to at least one person who has subscribed to this notification service. While not required, the person may be on a friends (contact) list of the player. A subscriber may also receive an alert or message when a team mate or participant in a game tournament logs onto the gaming environment. The message may comprise an invitation to one or more people to access the gaming environment and participate in playing a game thereon with the player.

Alternatively, the information included in a message can relate to billing a player for participating in the gaming environment, or indicate that a change has occurred in the content of a game, or provide a reminder to a player about a previously scheduled game.

The method may further include the step of enabling a person to select at least one of the forms noted above in which messages will be transmitted in response to the predefined event.

The method preferably further includes the step of mapping an identifier for the person, to a corresponding identifier of the person used by a messaging service, so that the message will be sent to the person by the messaging service, outside the gaming environment.

It is contemplated that a recipient of an alert or message might be enabled to take an action upon receiving the alert or message. For example, the recipient that might click on a uniform resource locator (URL) in the message or on another control to reply to an invitation to play in a game or listen to a voice mail.

Another aspect of the present invention is directed to a memory medium on which are stored machine instructions for carrying out the steps of the method discussed above. A still further aspect of the present invention is directed to a system that responds to a predefined event occurring within a gaming environment, by automatically transmitting an alert or message to a person outside the gaming environment. The system includes a game server that has a processor and a memory storing a plurality of machine instructions and is part of a gaming service that establishes the gaming environment. A communication interface couples the game server to a network that includes a secure gateway that connects to a network outside of the gaming environment. Execution of the machine instructions causes the processor to carry out functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
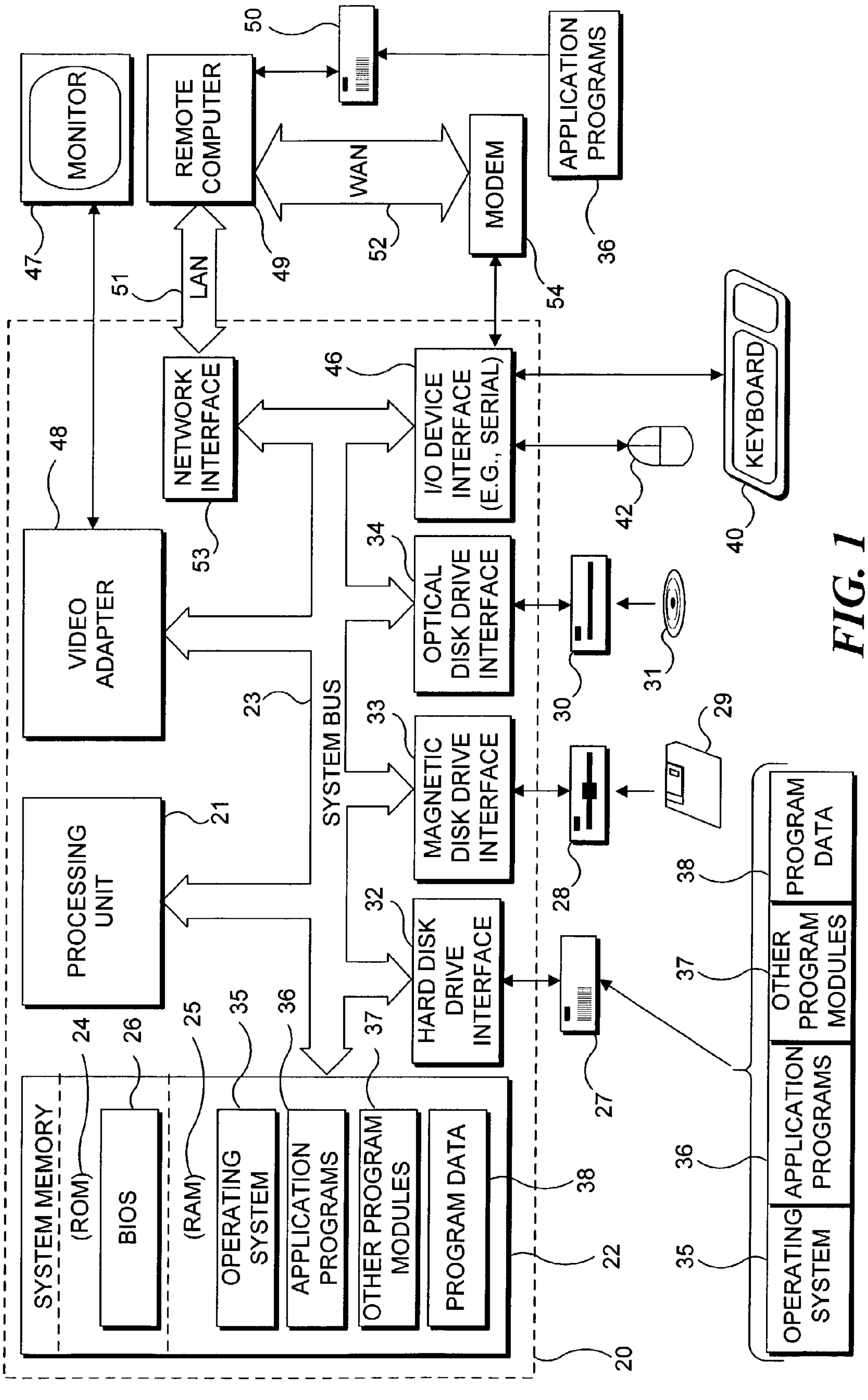
FIG. 1 is a functional block diagram illustrating a generally conventional personal computer, which is suitable for implementing specific functions of the present invention.

With reference to FIG. 1, an exemplary system suitable for implementing various portions of the present invention, including executing a Web browser such as Microsoft Corporation's INTERNET EXPLORER™ for accessing Web Pages over the Internet; this system is also useful for providing the functionality of a gaming service such as Microsoft Corporation's XBOX LIVE™. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface —not shown) and printers.

The present invention may be practiced on a single machine, however, PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46; i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. The servers employed to provide the gaming service functions will typically comprise computing devices much like that described above, but will likely access much larger hard drives or other non-volatile memory systems for storing data about subscribing users and for other elements of the gaming service.

Exemplar Game Console

Figure 2:
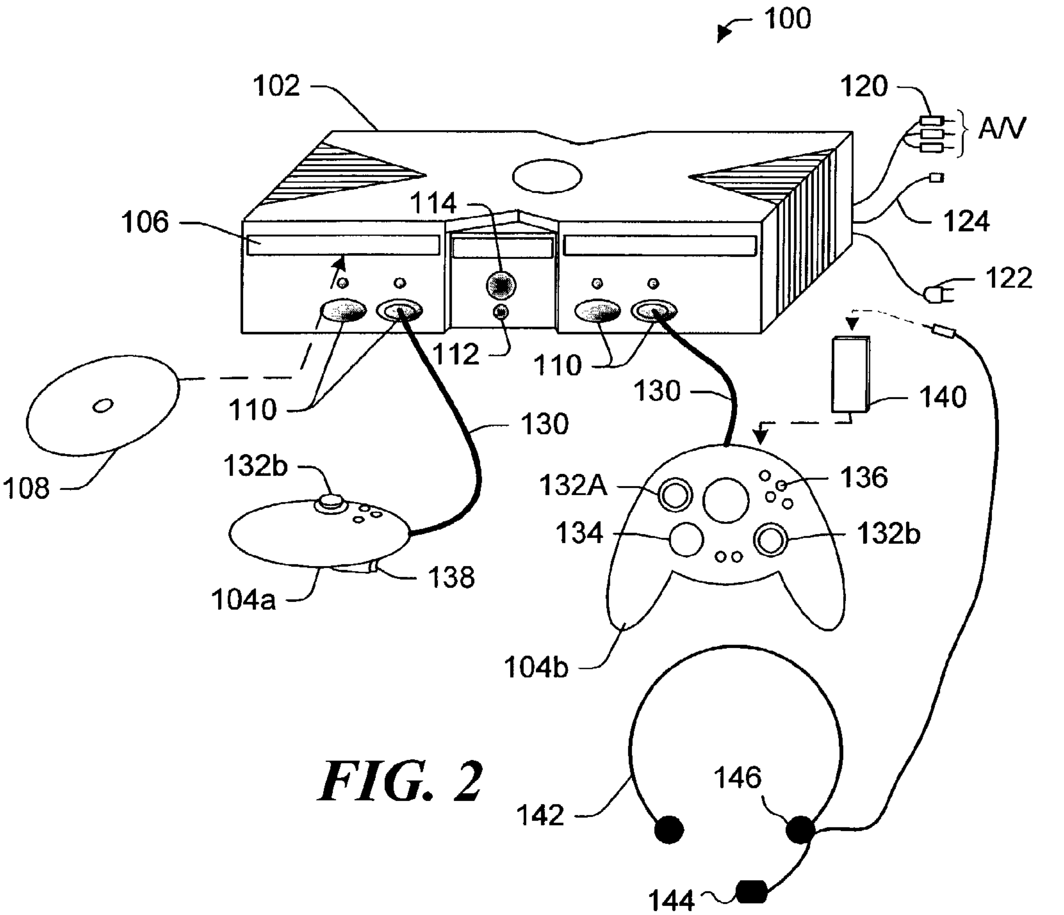
FIG. 2 is a schematic diagram of an exemplary game console that connects to a gaming service and communicates within the gaming environment.

As shown in FIG. 2, an exemplary electronic gaming system 100 includes a game console 102 and support for up to four user input devices, such as controllers **104*a* and 104*b*. Game console 102 is equipped with an internal hard disk drive (not shown in this Figure) and a portable media drive 106 that supports various forms of portable optical storage media, as represented by an optical storage disk 108**. Examples of suitable portable storage media include DVD disks and CD-ROM disks. In this gaming system, game programs are preferably distributed for use with the game console on DVD disks, but it is also contemplated that other storage media might instead be used, or that games and other programs can be downloaded from a gaming site over the Internet (or other network).

On a front face of game console 102 are four connectors 110 that are provided for electrically connecting to the controllers. It is contemplated that other types of connectors or wireless connections might alternatively be employed. A power button 112 and a disk tray eject button 114 are also positioned on the front face of game console 102. Power button 112 controls application of electrical power to the game console, and eject button 114 alternately opens and closes a tray (not shown) of portable media drive 106 to enable insertion and extraction of storage disk 108 so that the digital data on it can be read and loaded into memory or stored on the hard drive for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 may be further provided with a data connector 124 to transfer data through an Ethernet connection to a network and/or through a broadband connection to the Internet. Alternatively, it is contemplated that a modem (not shown) may be employed to transfer data to a network and/or the Internet. As yet a further alternative, the game console can be directly linked to another game console via an Ethernet cross-over cable (not shown).

Each controller 104*a* and 104*b* is coupled to game console 102 via a lead (or in another contemplated embodiment, alternatively, through a wireless interface). In the illustrated implementation, the controllers are Universal Serial Bus (USB) compatible and are connected to game console 102 via USB cables 130. Game console 102 may be equipped with any of a wide variety of user devices for interacting with and controlling the game software. As illustrated in FIG. 2, each controller 104*a* and 104*b* is equipped with two thumb sticks 132*a* and 132*b*, a D-pad 134, buttons 136, and two triggers 138. These controllers are merely representative, and other gaming input and control mechanisms may be substituted for or used in addition to those shown in FIG. 2, for controlling game console 102.

Removable function units or modules can optionally be inserted into controllers 104 to provide additional functionality. For example, a portable memory unit (not shown) enables users to store game parameters and port them for play on another game console by inserting the portable memory unit into a controller on the other console. Other removable function units are available for use with the controller. In connection with the present invention, a removable function unit comprising a voice communicator module 140 is employed to enable a user to verbally communicate with other users locally and/or over a network. Connected to voice communicator module 140 is a headset 142, which preferably includes a boom microphone 144 or other type of audio sensor that produces an input signal in response to incident sound, and a headphone 146 or other type of audio transducer for producing audible sound in response to an output signal from the game console. In another embodiment that is being contemplated (not shown), the voice communicator capability is included as an integral part of a controller (not shown) that is generally like controllers 104*a* and 104*b* in other respects. The controllers illustrated in FIG. 2 are configured to accommodate two removable function units or modules, although more or fewer than two modules may instead be employed.

Gaming system 100 is of course capable of playing games, but can also play music, and videos on CDs and DVDs. It is contemplated that other functions can be implemented by the game controller using digital data stored on the hard disk drive or read from optical storage disk 108 in drive 106, or from an online source, or from a function unit or module.

It must be emphasized that as supplied, game console 102 is incapable of browsing the Internet or connecting to Web addresses that display Web Pages defined by any form of hypertext markup language (HTML). Instead, it can only connect to a dedicated gaming service that has been setup to communicate with the game console over the Internet and to facilitate multiplayer games by subscribers to the service who connect through game consoles that are registered with the gaming service. Each connection over the Internet is through a VPN tunnel, so that the communications between the game console and the gaming service are secure. The game console is not currently provided with a conventional keyboard, so that entry of text messages or other text input is possible only by selecting alphanumeric characters from a display using one of the controllers. The game consoles do not have direct communication with parties outside of the environment for playing multiplayer games that is provided by the gaming service. Similarly, anyone who is not connected with a game console in the gaming environment cannot have direct communication with those who are connected to the gaming service. The present invention addresses this issue by automatically initiating sending messages or alerts to others outside the gaming environment in response to events that have occurred therein.

Functional Components of the Game Console

Figure 3:
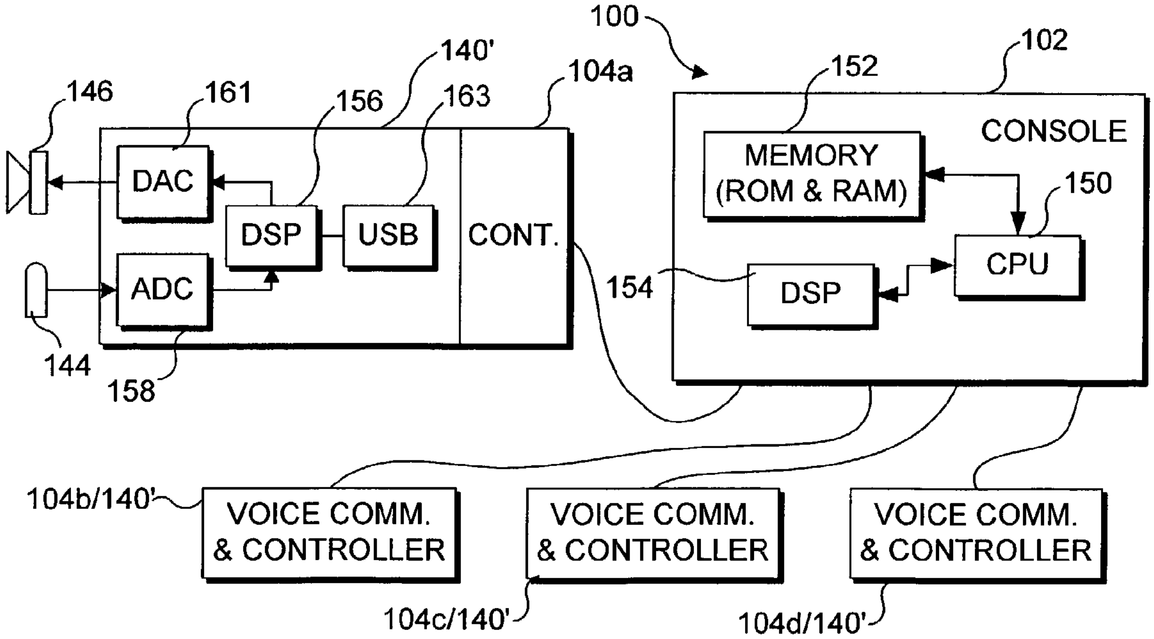
FIG. 3 is a schematic block diagram of the exemplary game console of FIG. 2, and a voice communication module used for communicating verbally with others in the gaming environment.

Turning now to FIG. 3, a functional block diagram illustrates, in an exemplary manner, components of the game console and components that are provided to facilitate voice or verbal communication between players during the play of electronic games on the multiplayer game console. As noted above, this embodiment of game console 100 can have up to four players on each console, and each player can be provided with a controller and voice communicator. Details of a voice communicator module 140' are illustrated in connection with its associated controller 104*a*. It will be understood that controllers 104*b*, 104*c*, and 104*d* (if coupled to game console 100) can optionally each include a corresponding voice communication module 140' like that coupled to controller 104*a*. In a current preferred embodiment, voice communication module 140' includes a digital signal processor (DSP) 156, an analog-to-digital converter (ADC) 158, a digital-to-analog converter (DAC) 161, and a universal serial bus (USB) interface 163. In response to sound in the environment that is incident upon it, microphone 144 produces an analog output signal that is input to ADC 158, which converts the analog signal into a corresponding digital signal. The digital signal from ADC 158 is input to DSP 156 for further processing, and the output of the DSP is applied to USB interface 163 for connection into controller 104*a*. In this embodiment, voice communication module 140' connects into the functional unit or module port on controller 104*a* through a USB connection (not separately shown). Similarly, digital sound data coming from game console 100 are conveyed through controller 104*a* and applied to USB interface 163, which conveys the digital signal to DSP 156 and onto DAC 161. DAC 161 converts the digital signal into a corresponding analog signal that is used to drive headphone 146.

With reference to multiplayer game console 100, several key functional components are shown, although it should be understood that other functional components are also included, but not shown. Specifically, game console 100 includes a central processing unit (CPU) 150, a memory 152 that includes both read only memory (ROM) and random access memory (RAM). Also provided is a DSP 154. The digital signal produced by ADC 158 in response to the analog signal from microphone 144 is conveyed through controller 104*a* to CPU 150, which handles encoding of the voice stream signal for transmission to other local voice communication modules and to other game consoles over a broadband connection through an Ethernet port (not shown in FIG. 3) on the game console.

An alternative embodiment employs DSP 156 in voice communication module 140' to encode the digital signal produced by ADC 158 in response to the analog signal from microphone 144. The encoded data are then conveyed through controller 104*a* to CPU 150, which again handles transmission of the encoded data to other local voice communication modules and other game consoles over the broadband connection on the game console.

Digital signals conveyed as packets over a direct or network connection are input to CPU 150 through the Ethernet port on game console 100 (or from other voice communication modules and controllers connected to the same game console), and are processed by the CPU to decode data packets to recover digital sound data that is applied to DSP 154 for output mixing. The signal from DSP 154 is conveyed to the intended voice communication module for the player who is the recipient of the voice communication for input through USB interface 163. Data and verbal communications over the Internet between players participating in a multiplayer game through the gaming service are not accessible by others who are simply connected to the Internet via a PC or other type of general computing device, because these communications are conducted through the VPN tunnels that are relatively secure.

Gaming Environment

Figure 4A:
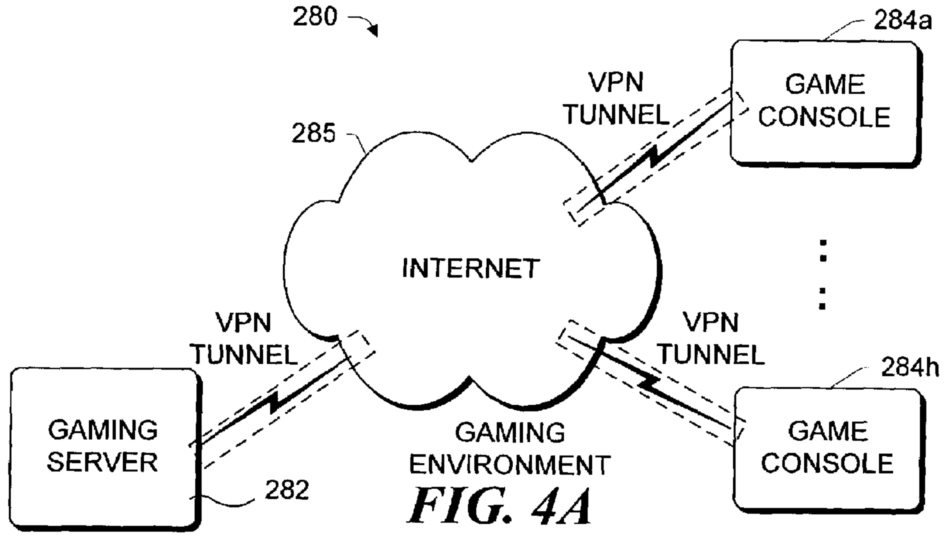
FIG. 4A is a schematic block diagram illustrating a plurality of game consoles in communication with a game server through VPN tunnels, over the Internet.
Figure 4B:
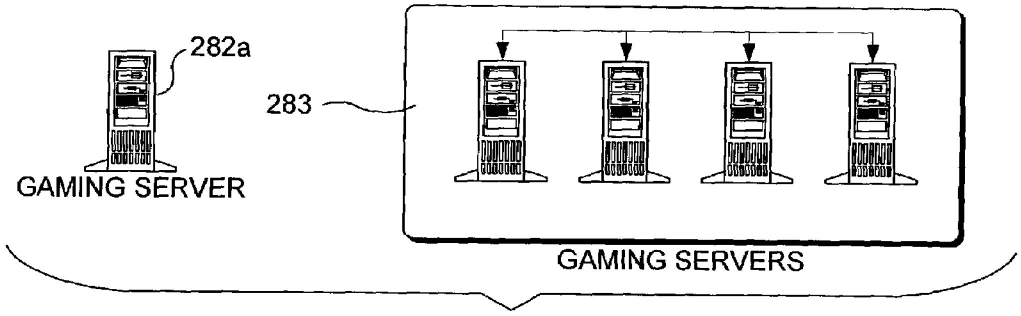
FIG. 4B illustrates a game server and a game server system used for implementing the gaming environment.

FIGS. 4A and 4B illustrate different aspects of the gaming environment. In FIG. 4A, a schematic diagram 280 shows that the gaming environment comprises a plurality of game consoles 284*a*-284*h*, which are connected to a gaming server 282*a*. Data packets are conveyed between the gaming server and the game consoles through VPN tunnels, over Internet 285. Each game console 284*a*-284*h* is thus connected in secure communication with gaming server 282, which as shown in FIG. 4B may comprise a single server 282*a*, or alternatively and more likely, will include a plurality of servers 283 that are coupled together to carry out specific functions required for the gaming service. Use of the VPN tunnel insures a secure communication link between each game console and the gaming service. The secure gaming environment of FIG. 4A does not provide any option for connecting a game console over the Internet to any other device and only permits communication between game consoles that are connected to the gaming service, to enable the game consoles to participate in multiplayer games. Although a game console can conduct certain administrative functions such as subscribing, selecting passwords, and indicating other players with whom a person using the game console wants to participate in a multiplayer game, the game consoles are unable to communicate over the Internet outside the gaming environment defined by FIG. 4A. Thus, a game console of this type cannot connect with a Web page using an HTML Web browser, as is possible on a PC or other general computing device that has an Internet connection.

Figure 4C:
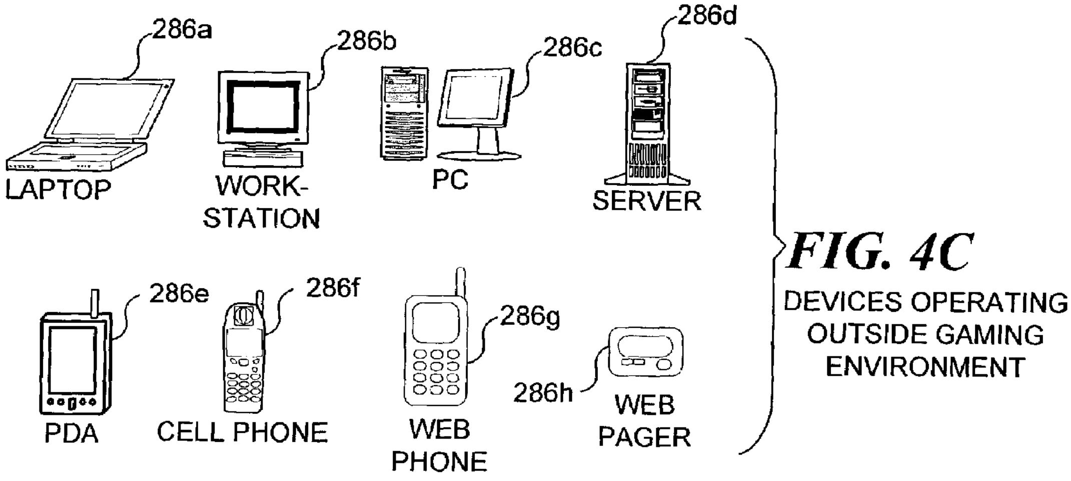
FIG. 4C illustrates a plurality of different types of computing devices that can receive messages outside the gamine environment, in response to events occurring in the gaming environment.

The present invention addresses the limitations of the gaming environment by enabling alerts or messages to be sent outside the gaming environment in response to events that occur within that environment. The alerts can be sent to a variety of devices that communicate with the Internet outside the gaming environment, as shown in FIG. 4C. Such devices include without limitation, a laptop 286*a*, a workstation 286*b*, a PC 286*c*, a server 286D, a personal data assistant (PDA) 286E, a cell phone 286*f*, a Web phone 286*g*, and a Web pager 286*h*. In an initial application of the present invention, only text messages will be sent to devices like those shown in FIG. 4C. However, it is contemplated that in the future, voice messages may be sent as well as text messages. These messages or alerts convey information to the recipient, who has indicated the events that are of interest and has selected the form in which the alert or message is to be delivered, as described below.

Figure 5:
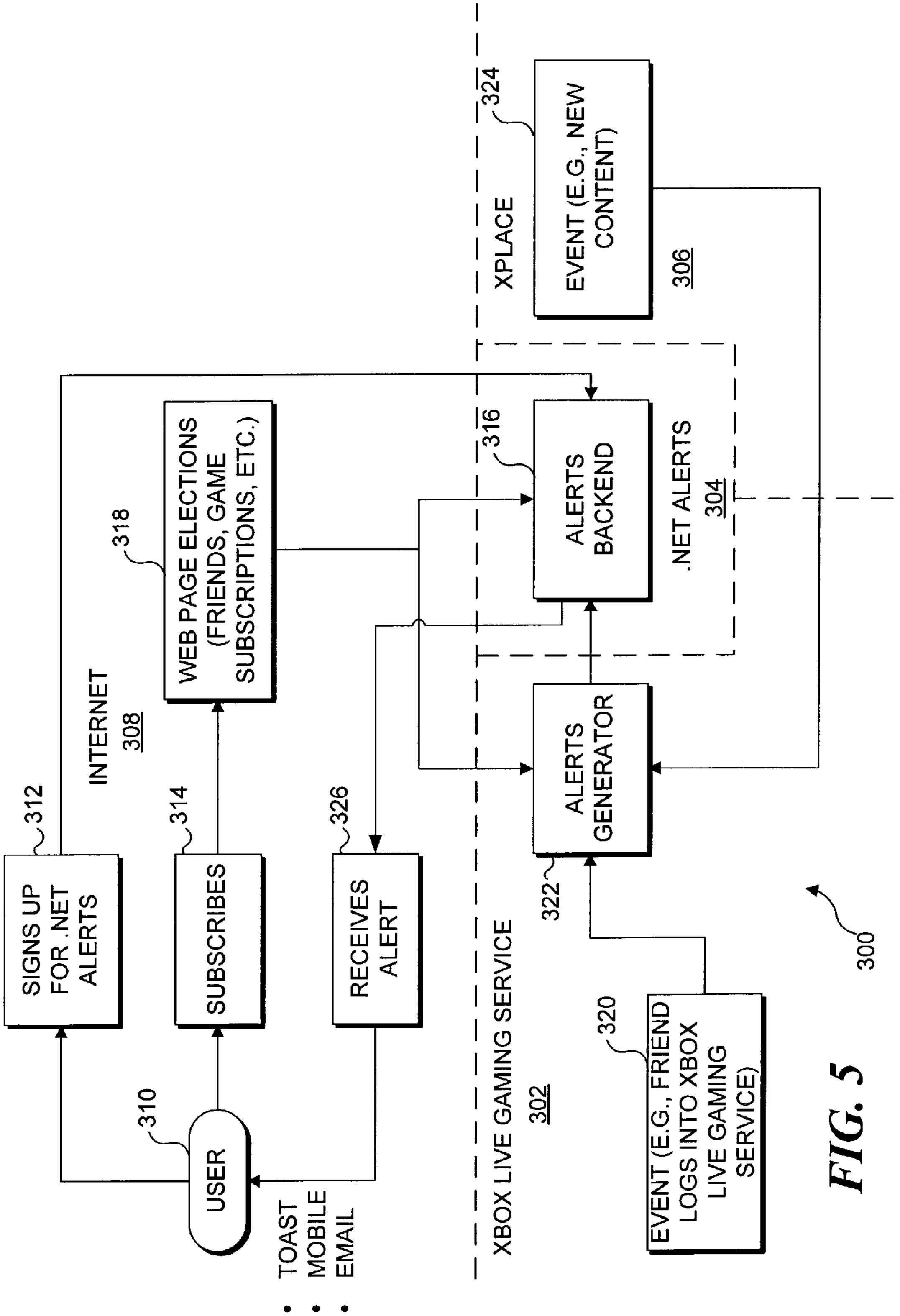
FIG. 5 is a block diagram illustrating the functional steps implemented by a subscribing user and the game server in carrying out the present invention.

Interaction Between Gaming Service and Subscriber Outside the Gaming Environment FIG. 5 includes a schematic diagram 300 that is helpful in explaining the interaction between a subscriber and the alert notification service to obtain the alerts and messages provided by the present invention in regard to the gaming environment. In FIG. 5, the upper part of the schematic diagram above the long horizontal dash line represents steps that are taken outside the gaming environment. In this example, the gaming environment, below the horizontal dash line, is provided by Microsoft Corporation's XBOX LIVE™gaming service, as indicated by reference number 302. Also appearing below the horizontal dash line is .NET ALERTS 304, which is also outside the gaming environment, and XPLACE 306. XPLACE 306 implements part of the administrative functionality of the gaming service.

A user 310 signs up for the .NET ALERTS service, as indicated in a block 312, by connecting over the Internet from a PC or other computing device to an alerts backend 316 within .NET ALERTS region 304. The .NET ALERTS service enables a user to receive alerts in regard to a variety of different criteria such as changes in stock prices, calendar dates, traffic conditions, appointments, etc. Thus, the user will provide a PASSPORT™ identification or other network identification that is associated with the user in providing the .NET ALERTS service.

When the user signs up for the .NET ALERTS service, or at some later time, user 310 may also choose to subscribe to the alert notification service provided in connection with the present invention. The alert notification service enables the user to receive alerts or messages in response to one or more of several different kinds of events that occur within the gaming environment. As indicted by a box 314, the user subscribes to the alert notification service by opening a Web page with a conventional browsing program such as Microsoft Corporation's Internet Explorer. On the Web page, as indicated in a box 318, the user can make various elections. For example, the user can identify one or more friends to be included in a list associated with the user, so that the user can be notified when an event relating to the friends occurs within the gaming environment. The user can also select the form in which the user will receive alerts or messages in response to events of concern to the user within the gaming environment. The information entered by the user on the Web page in block 318 is supplied to alerts backend 316 and to an alerts generator 322.

Several different kinds of events can be selected by the user to initiate transmission of an alert or message to the user. For example, as indicated in a block 320, an event occurring within XBOX LIVE gaming service 302 may occur when a friend in a contact list of the user logs into the XBOX LIVE gaming service. Or the user may choose to only be notified if a friend logs into a specific multiplayer game. However, the present invention is not limited to responding only to acts by those in a user's friends list. For example, the event can be when a teammate logs into the gaming service, or if a person who is ahead of the user on a leader board logs in to a play a specific game. The user can also choose to be provided alerts or messages in response to various other types of events occurring within the gaming service, as discussed below.

In addition to responding to events occurring in connection with player actions within the gaming service, the present invention also can provide an alert in regard to events that are of a more administrative nature and which occur within XPLACE 306. For example, the user may be notified when a new version of a game is released or if changes in the content of specific multiplayer games available to be played on the gaming service occur. It is also expected that the user will receive alerts related to billing for services such as downloading games and for other features provided by the gaming service, and to be provide information about the user's gaming service account. The events occurring within XPLACE 306 are transferred from a block 324 to alerts generator 322, which also stores the elections made by user 310 when subscribing to the alerts service and any changes that are made by the user thereafter. Accordingly, alerts generator 322 is able to provide an indication to alerts backend 316 when any of the events for which the user has requested an alert has occurred, or if one of the administrative events has occurred in XPLACE 306. When notification of an event is provided to alerts backend 316, it issues or arranges for an alert or message to be transmitted to the user. As indicated in a block 326, the user receives the alert that is transmitted in one of the forms that the user has elected. Currently, the user may elect to receive such an alert either as a toast pop-up in an instant messaging program, and/or as a text (or eventually, as a voice) message on a cell phone, or other mobile communication device such as a PDA, or Web pager. In addition, or alternatively, user 310 can receive an email message alerting the user that a predetermined event has occurred within the gaming environment.

Specific Example Illustrating an Application of the Present Invention

Figure 6:
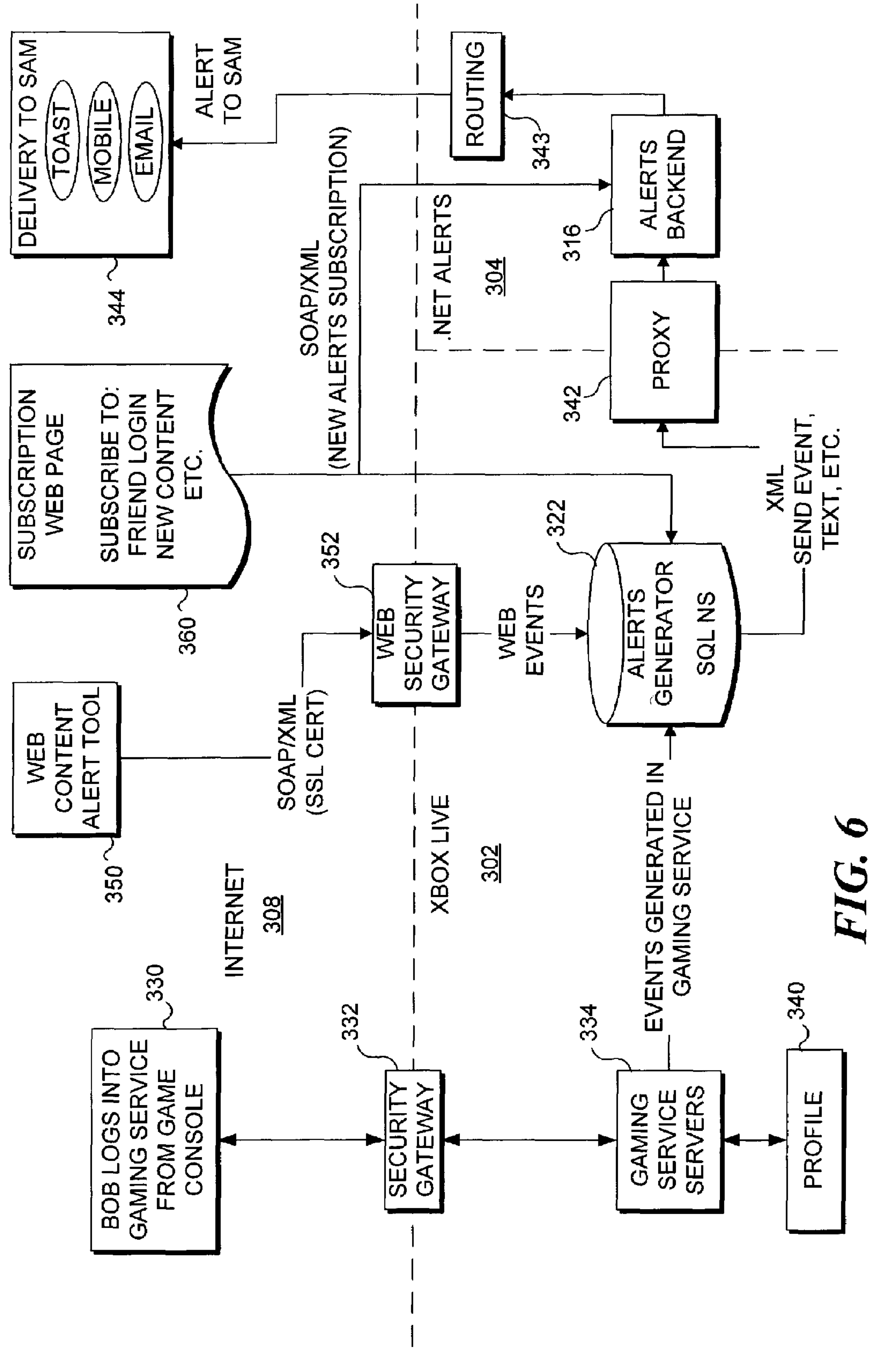
FIG. 6 is an example illustrating the automatic transmission of a message in response to an event (i.e., a player accessing the gaming environment), in accord with the present invention.

FIG. 6 illustrates further details of an example that shows how the present invention implements issuance of an alert or message to a subscriber of the notification service. In this example, a user named "Sam" has subscribed to the alert notification service and wants to be alerted when any friend in a contact (friends) list for Sam logs onto the gaming service from a game console. One of the friends within Sam's contact list is named "Bob." It should be noted that if a friend is in one person's contact list, that person will also be in the friend's contact list. Accordingly, if Bob has also subscribed to the alerts service, he may choose to be notified if Sam logs onto the gaming service from a game console.

In this example, a block 330 indicates that Bob has logged into the gaming service by connecting to a security gateway 332. The communication between Bob's game console and the security gateway is over Internet 308, through a secure VPN tunnel, as noted above. When Bob logs into the gaming service, he enters a user name and a password. In addition, the security gateway queries the game console used by Bob to obtain an identifier that is checked to ensure that the game console is permitted to access the XBOX LIVE™ gaming service. Once Bob and his game console have been securely authenticated and enabled to log onto the gaming service, his connection through security gateway 332 is coupled to gaming service servers 334. Bob's online presence on the gaming service is established by a presence service that runs on gaming service servers 334, and the event corresponding to Bob logging onto the service is sent to alerts generator 322, which implements Microsoft Corporation's Sequel Notification Service (SQL NS). In addition, Bob's profile 340 is loaded at this time. The profile contains his contact list and other relevant information about Bob.

In response to detecting the event corresponding to Bob logging into the gaming service, alerts generator 322 creates an extended markup language (XML) send event message, including the text of the alert and other relevant information corresponding to the event, which is transmitted to a proxy 342. Proxy 342 provides security against any intrusion from outsiders on the Internet into alerts generator 322 and is coupled to alerts backend 316, which conveys the alert or message to a routing block 343. Routing block 343 ensures that the alert is transmitted to Sam in the form(s) that Sam has elected. As shown, the alert is delivered to Sam in a block 344 as either a toast pop-up message in the instant messaging service to which Sam subscribes, or as a text (or potentially a voice) message delivered to a mobile communication device such as a cell phone carried by Sam, or alternatively, as an email delivered to an email account of Sam which is displayed to Sam when he checks his email messages on a PC or other computing device. Sam can interact with routing 343 to change the one or more forms used to send these alert messages, by accessing the routing over the Internet from within a browser program.

When a user receives an alert or message, the message may enable the recipient to respond to the alert or message. For example, an alert delivered as a email message might include a URL so that the recipient need only click on the URL in the message to accept an invitation to play a game delivered from a player connected to the gaming service. The player would then receive the acceptance within the gaming environment. An alert or message delivered in text message to a cell phone might include a control that when selected by the recipient, would activate a voice mail message then heard by the recipient.

A subscription Web page 360, which can be enumerated by alerts generator 322, is provided to enable Sam to initially subscribe to the alert notification service, or to change the events or form of the alerts provided by the alert notification service. The alerts generator enumerates the subscription Web page to indicate the optional events and other choices that can be selected when subscribing, and if the user previously subscribed to the alert notification service, indicates the choices that were previously made. Any changes in existing subscriptions or new alert subscriptions are conveyed by a simple object access protocol (SOAP) using an XML message, in response to selections made by a new or existing subscriber in subscription Web page 360. This SOAP/XML message is conveyed to both alerts backend 316 and to alerts generator 322, to enable the alerts generator to respond to the events selected by the subscriber that occur in the gaming service.

As indicated above, the events may relate to administrative functions or to changes in gaming content. Although such events may occur completely within the gaming environment, it is also contemplated that an administrator of the gaming service or a game developer may initiate an alert corresponding to an event related to changes in game content or to billing. Web content alert tool 350 is used to generate a SOAP/XML message, which is securely transmitted using a secure sockets layer (SSL) certificate. This message is received by Web security gateway 352, which is connected to alerts generator 322 within the gaming environment.

Figure 7:
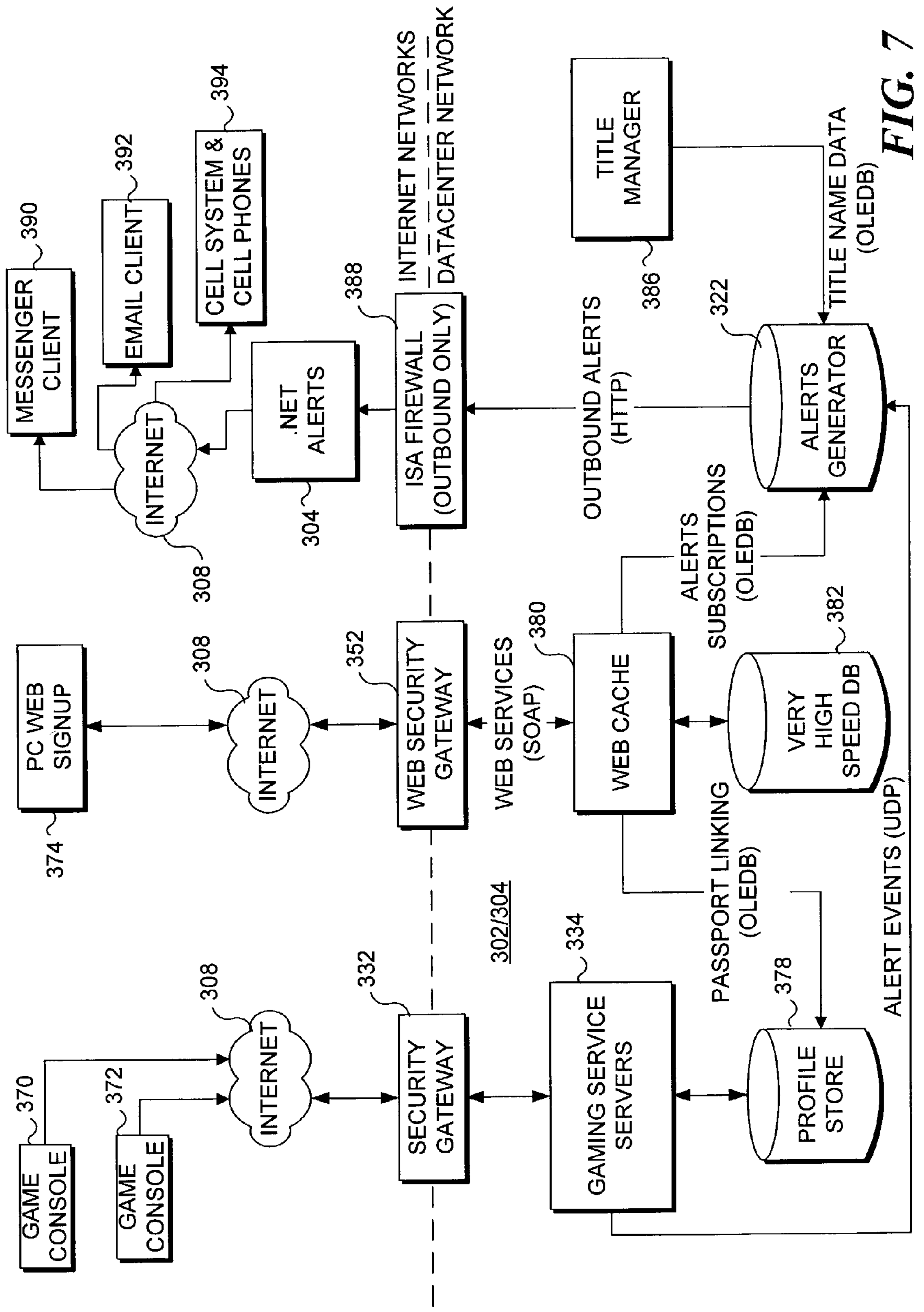
FIG. 7 is a block diagram illustrating the functional components of the present invention.

FIG. 7 illustrates functional components used in implementing the present invention, showing how the components interact and communicate over Internet 308. In this simplified example, only two game consoles 370 and 372 are illustrated. These game consoles connect through Internet 308 to security gateway 332, using VPN tunnels to ensure secure communication. Security gateway 332 obtains identifying data for both the users and the game consoles to authenticate the connections. Once the credentials of the users and game consoles have been confirmed by security gateway 332, game consoles 370 and 372 are coupled in communication with gaming service servers 334. In addition, the profile for each user on these game consoles is loaded from a profile store 378 when the user logs into the gaming service, so that the list of friends for the user and other information are available. For example, the information in the profile may include a mapping between a PASSPORT™ or other web identification for the friends and their gamer tags (which are associated with the person's XUID—discussed below).

Each user of the gaming service has a gaming service identification, called an XUID. Friends of a user who have just logged into the service also have corresponding XUIDs associated with their names. A user may also have a PASSPORT™ or other Internet identification, referred to as a PUID, that is used for identifying the user during transactions on the Internet. If a user has a PUID, a mapping between the XUID and the PUID is maintained using object linking embedded database (OLEDB) calls from a Web cache 380 to the databases where the linking is stored, in response to user actions on the Internet. The mapping is stored both in very high speed database 382 and in profile store 378, to improve overall performance of the system.

Each friend of each user who has logged into the gaming service and has subscribed to the alert notification service (i.e., wants to be notified when the user logs onto the gaming service or a specific game on the gaming service) is thus readily identified by their XUID, which may be associated with the corresponding PUID for the friend, to enable an alert or message to be transmitted to the friend through .NET ALERTS or another alert service in the form(s) specified by the friend. Web cache 380 manages subscriptions to the alert notification service and provides information concerning the alerts subscriptions to alerts generator 322. Gaming service servers 334 determine that an event has occurred that may require notification of a current player's friend, and sends the PUID of each friend to alerts generator 322, which determines if the friend has subscribed to the notification alert service, and if the friend has chosen to be notified of that type of event. If so, the alerts generator generates the alert or message as XML, which is transmitted to .NET ALERTS service 304 via an Internet security and acceleration (ISA) firewall 388 using hypertext transfer protocol (HTTP). Outbound alerts or message from the XBOX LIVE gaming service are all uniform.

Also coupled to alerts generator 322 is a title manager 386. Title manager 386 is used to manage the relationship between game title names and game title identifications (IDs). Events generated automatically by the service will contain the title ID. Alerts generator 322 maps a title ID to the actual game name (which is localized, as appropriate, for the subscribing user) before sending the alert or message related to the game.

ISA firewall 388 accepts only outbound alerts or messages and ensures that alerts generator 322 is protected from anyone accessing the alerts service through an outside Internet connection. The ISA firewall communicates directly with .NET ALERTS service over the Internet. It is the responsibility of . NET ALERTS service to then deliver the alert or message to the user at whatever endpoint (i.e., in the one or more forms) selected by the user when subscribing to the alerts notification service, i.e., as an email, toast, pager message, etc. Thus, an alert is transmitted by the .NET ALERTS service to a messenger client 390, an email client 392, or to a cell system and interconnected cell phones, as indicated in a block 394, and as discussed above.

Web cache 380 is used to temporarily store data that is displayed to users who have accessed the web security gateway with a PC or other general computing device over the Internet and is not particularly relevant to the present invention. The Web cache serves as a termination for SOAP and converts messages related to subscriptions to OLEDB when users modify their subscriptions to the alerts notification service.

As also noted above, a user can sign up for the .NET ALERTS service over the Internet by browsing to a designated Web page using a PC or other suitable computing device, as indicated by a box 374. In addition, the user can subscribe to the alerts notification service in accord with the present invention by accessing a corresponding Web page over the Internet. Information provided by the user who is signing up for the alerts notification is conveyed through Internet 308 to Web security gateway 352. Information about the user is conveyed through Web security gateway 352 (using SOAP protocol) to Web cache 380. The Web cache has access to the data stored on very high speed database 382. Thus, when a user subscribes to the alerts notification service or makes changes to the options previously selected for the service, Web cache 380 transfers that information to alerts generator 322.

Figure 8:
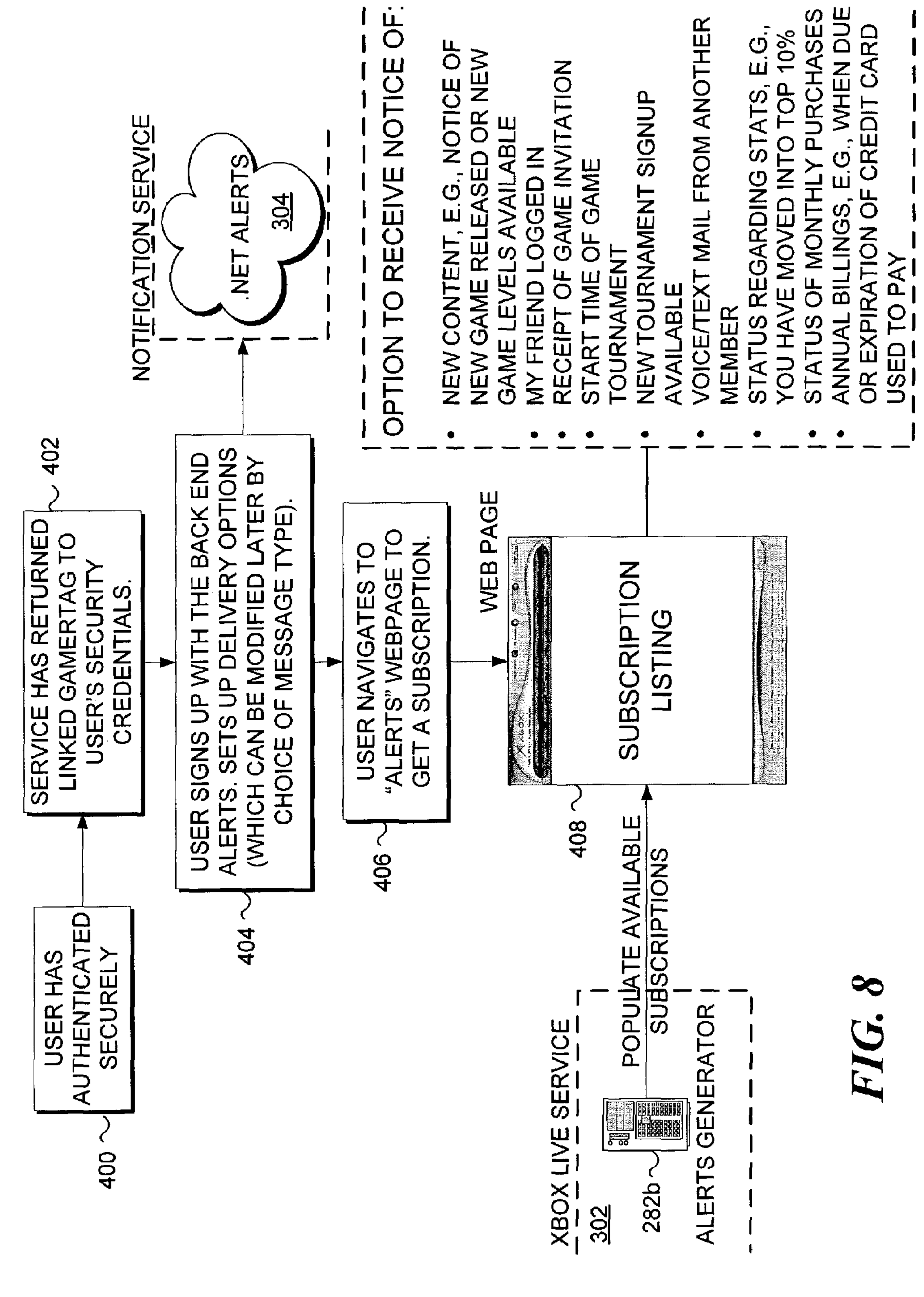
FIG. 8 is a functional block diagram illustrating the steps carried out when a user subscribes to the alert notification service.

FIG. 8 illustrates the steps carried out when a user subscribes to the alert notification service to be notified through an alert or message when predetermined events occur within the gaming environment. In a step 400, the user securely authenticates with the Web site through which the user will subscribe to the alert notification service. The authentication process involves providing a user name and password that are compared to the user name and password of users who have signed up for the multiplayer gaming service. In a step 402, the gaming service returns a linked gamer tag that is associated with the user's security credentials, i.e., the user's name and password. In a step 404, the user signs up with the backend alerts service and selects the delivery form(s) that the user prefers for having alerts delivered, as described above. The form(s) in which the user chooses to have the alerts or message delivered is provided to the .NET ALERTS portion of the notification service. In a step 406, the user navigates to the "alerts Web page" to obtain a subscription to the alert notification service. An exemplary Web page 408 enables the user to select one or more events for which the user wants to receive an alert or message providing notification that the event has occurred within the gaming service.

The Web page populates the subscription listing with the possible events that may be of interest to the user. For example, as shown to the right of Web page 408, the user may choose from several different events for which notification might be desired. The user may choose to receive notice when a new game is released or whenever new game levels are available in a particular game. Also, the user may choose to be alerted if a friend on the user's contact list has logged into the gaming service, or if the friend has logged into a specific game. The user may elect to receive notification of an invitation to join in playing a game that is sent by a friend from within the gaming environment.

If the user has signed up for a game tournament, the user may choose to be advised that the start time of the game tournament is within a predefined time period. Similarly, the user may choose to be notified when a tournament sign up becomes available, giving the user a chance to sign up to participate in the game tournament. A user may elect to receive a voice or text mail message from another member of the subscription service, who is connected to the gaming service. For example, the user may receive a text/voice message indicating that a friend intends to play a game at a specific time, so that the user may join in playing the game at that time. Yet another option relates to receiving notification of a change in the status of the user. For example, the user may receive a notification that he has moved into the top ten percent of the players participating in playing a specific multiplayer game on the gaming service.

It is contemplated that when connected into the gaming environment, a user may optionally pay an extra fee to play in certain games, or may have the option to download games from within the gaming environment. If so, the user may elect to receive a message indicating the current status of all monthly purchases made by the user within the gaming environment. The user may choose to receive a message indicating when the annual billing is due for participating in the gaming service, or a message indicating that the user's credit card expiration date is about to occur, so that automatic billing to the credit card can no longer occur until the user updates the expiration date. It should be apparent that the events noted above are simply exemplary, and that many other types of events might be selected by a user for providing alerts that are transmitted outside the gaming environment in the form(s) selected by the user.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for responding to a predefined event occurring within a gaming environment, by automatically transmitting an alert or message to a person outside the gaming environment, comprising the steps of:

detecting that the predefined event has occurred within the gaming environment, wherein:

the gaming environment provides a secure and limited access such that players only gain access to the gaming environment through a secure gateway, wherein:

the secure gateway is inaccessible by any person communicating over a network that is outside of the gaming environment; and the network is inaccessible from within the gaming environment by players participating in the gaming environment; and in response to the predefined event occurring within the gaming environment, transmitting an alert or message to the person over the network, wherein the alert or message provides information related to the predefined event.

2. The method of claim 1, further comprising the step of transferring at least an indicia of the information to be provided in the message to an alerts service that communicates outside the gaming environment, said alerts service then transmitting the alert or message with the information to the person over the network.

3. The method of claim 1, wherein the step of transmitting the alert or message comprises transmitting an email to the person over the network, said email including the information.

4. The method of claim 1, wherein the step of transmitting the alert or message comprises transmitting the alert or message through the network to a communication system that transmits the alert or message to a portable communication device of the person, said message including the information.

5. The method of claim 1, wherein the step of transmitting the alert or message comprises transmitting a pop-up notification to the person over the network, said pop-up notification including the information displayed to the person.

6. The method of claim 1, wherein the predefined event is detected when a player gains access to the gaming environment, said information identifying the player and being transmitted to at least one person who is on a list of the player.

7. The method of claim 6, wherein the alert or message comprises an invitation to said at least one person to access the gaming environment and participate in playing a game therein with the player.

8. The method of claim 1, wherein the information included in the alert or message relates to billing a player for services rendered in the gaming environment.

9. The method of claim 1, wherein the information included in the alert or message refers to a change in gaming content within the gaming environment.

10. The method of claim 1, wherein the information included in the alert or message is a reminder to a player to play a previously scheduled game within the gaming environment.

11. The method of claim 1, further comprising the step of enabling a person to select at least one form in which alerts or messages will be transmitted in response to the predefined event, said at least one form being selectable from among a plurality of different forms.

12. The method of claim 11, wherein the plurality of forms include an email, a pop-up display, and a message perceived on a portable communication device that is coupled to a communication system.

13. The method of claim 12, wherein the portable communication device comprises a cellular telephone and the communication system comprises a cellular communication system.

14. The method of claim 1, further comprising the step of mapping an identifier for the person on the gaming environment to a corresponding identifier of the person that is used on the network, so that the alert or message will be sent to the person by the alerts service, outside the gaming environment.

15. A memory medium on which are stored machine instructions for carrying out the steps of claim 1.

16. A system that responds to a predefined event occurring within a gaming environment, by automatically transmitting an alert or message to a person outside the gaming environment, comprising:

a game server that includes a processor and a memory storing a plurality of machine instructions, said game server being included within a gaming service that establishes the gaming environment and further including a communication interface that couples the game server to a network; and wherein said processor executes the machine instructions stored in the memory, causing the processor to carry out a plurality of functions, including:

detecting when a predefined event occurs within the gaming environment, wherein:

the gaming environment provides a secure and limited access such that players only gain access to the gaming environment through a secure gateway wherein:

the secure gateway is inaccessible by any person communicating over a network that is outside of the gaming environment; and the network is inaccessible from within the gaming environment by players participating in the gaming environment; and in response to detecting the predefined event, initiating transmission of an alert or message to a person outside the gaming environment over the network.

17. The system of claim 16, further comprising an alerts service having a server that includes a communication interface, a memory, and a processor coupled to the communication interface and the memory of the alert server, wherein said processor of the alert server executes the machine instructions stored in the memory of the alert server to carry out a further plurality of functions, including receiving at least an indicia of information to be included in the alert or message transmitted from the game server and in response, transmitting the alert or message to a person outside the gaming environment, over the network.

18. The system of claim 17, wherein the alert or message is transmitted over the network as an email.

19. The system of claim 17, wherein the alert or message is transmitted over the network to a communication system that retransmits the alert or message to a portable communication device.

20. The system of claim 17, wherein the alert or message is transmitted over the network as a pop-up notification, for display to a recipient.

21. The system of claim 17, wherein the machine instructions stored in the memory of the game server further cause the processor of the game server to map an identifier of the person within the gaming environment to a corresponding identifier of the person that is used to identify the person on the network, so that the alert of message will be sent to the person by the alert server, outside the gaming environment.

22. The system of claim 16, wherein execution of the machine instructions causes the game server to detect that the predefined event has occurred when a player gains access to the gaming environment, and wherein execution of the machine instructions causes the processor to initiate transmittal of information identifying the player to at least one person who is on a list of the player, wherein said list is stored in the memory.

23. The system of claim 22, wherein the alert or message comprises an invitation to said at least one person to access the gaming environment and participate in playing a game thereon with the player.

24. The system of claim 16, wherein the information included in the alert or message relates to billing a player for services rendered in the gaming environment.

25. The system of claim 16, wherein the information included in the alert or message refers to a change in a gaming content within the gaming environment.

26. The system of claim 16, wherein the information included in the alert or message is a reminder to a player to play a previously scheduled game within the gaming environment.

27. The system of claim 16, wherein execution of the machine instructions further causes the processor to enable a person to select at least one form in which alerts or messages will be transmitted in response to the predefined event, said at least one form being selectable from among a plurality of different forms.

28. The system of claim 27, wherein the plurality of forms include an email, a pop up that is displayable, and a message perceivable on a portable communication device that is coupled to a communication system.

* * * * *